Sept. 9, 1930.        R. KRUMHOLZ        1,775,203
FLOWER SUPPORT
Filed Oct. 24, 1929
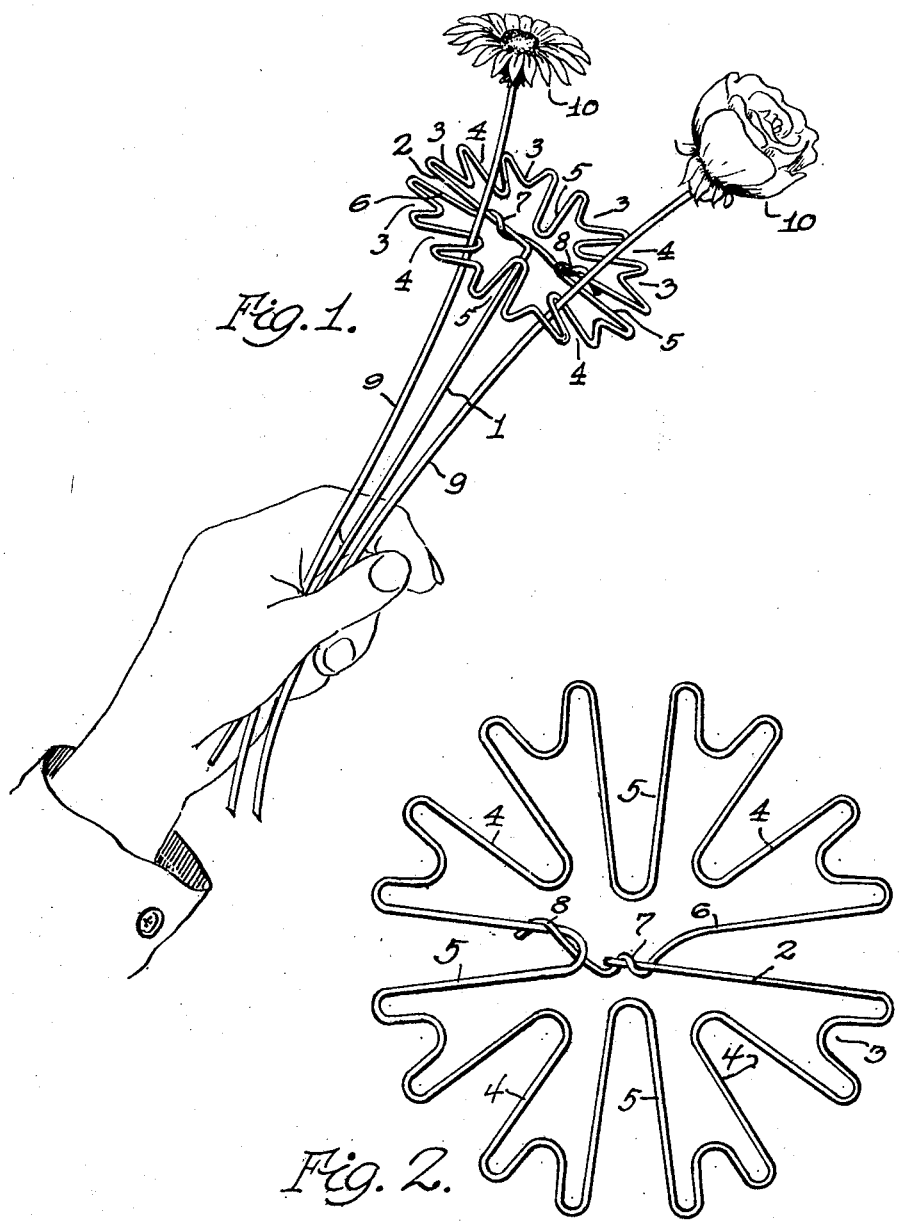
INVENTOR
Robert Krumholz,
BY
ATTORNEYS Patented Sept. 9, 1930

1,775,203

UNITED STATES PATENT OFFICE

ROBERT KRUMHOLZ, OF CENTER LINE, MICHIGAN

FLOWER SUPPORT

Application filed October 24, 1929. Serial No. 402,159.

The present invention pertains to a novel flower support or device for maintaining the flowers of a bouquet in a proper and attractive position. It is well known that when flowers are ordinarily grouped into a bouquet they tend to form too compact a mass, and that considerable time and skill is required to arrange the flowers with proper spacing for an attractive and esthetic appearance.

The object of the invention, accordingly, is to provide a simple and effective device for maintaining the flowers in the proper spaced relation. The device consists of a flat head made from sheet material or from a single length of wire bent to form a stem and a substantially circular head, the head having inward indentations for receiving separate stems and thus maintaining the flowers spaced from the center of the head. Moreover, the indentations are of varying depths so that the flowers will be held spaced unequal distances from the center of the head.

The invention is fully disclosed by way of example in the following description and in the accompanying drawing, in which—

Figure 1 is a perspective view showing the manner of utilizing the device, and

Figure 2 is a plan view of the support.

Reference to these views will now be made by use of like characters which are employed to designate corresponding parts throughout.

The device comprises preferably a single wire having a straight or stem portion 1 and then bent at right angles to form a radial member 2 which is approximately equal to the radius of a circle around which at least some of the flowers are to be grouped. The wire is then formed into a substantially circular head consisting of shallow indentations 3 and deeper indentations 4 and 5 which extend towards the stem 1 and have their mouths opening outwardly. Alternatively, the head may be stamped or cut out of sheet material such as cardboard or tin.

It will be seen in Figure 2 that the indentations 4 are shallower than the indentations 5, and that these indentations are arranged alternately with a shallow indentation 3 formed between adjacent indentations 4 and 5.

After the wire, in the formation of these indentations, has been brought around to a point near to the radial member 2, it is carried inwardly as at 6, coiled around the angle between the member 2 and the stem 1 as indicated by the numeral 7, and then carried diametrically to one of the longer indentations and twined around one of the sides thereof as indicated by the numeral 8. The length of the wire may be predetermined so that the remaining extremity thereof will occur at the twined portion 8 or the wire may be cut after this portion is formed.

In arranging a number of flowers in a bouquet, the stem 1 is held in one hand and the stems 9 of the flowers are also held in the same hand. It is therefore possible to insert the stems into the indentations by a movement inwardly of the wire head, and the blossoms 10 of the flowers are obviously positioned above the plane of the wire head and at the desired distance therefrom. It will now be apparent that the stems and blossoms will maintain the position determined by the indentations of the wire head, and that the ordinary difficulties in preparing a bouquet are avoided.

Although a specific embodiment of the invention has been illustrated and described, it will be understood that various alterations in the details of construction may be made without departing from the scope of the invention, as indicated by the appended claims.

What I claim is:—

1. A flower holder comprising a wire bent to form a stem and a substantially circular head at one end of said stem, the wire constituting said head being formed with indentations of unequal depths.

2. A flower holder comprising a wire bent to form a stem and a substantially circular head at one end of said stem, the wire constituting said head being formed with indentations opening outwardly of said head and extending inwardly of said head.

3. A flower holder comprising a wire bent to form a stem and a substantially circular head at one end of said stem and formed around said stem as a center, the wire constituting said head being formed with indentations of unequal depths.

4. A flower holder comprising a wire bent to form a stem and a substantially circular head at one end of said stem and formed around said stem as a center, the wire constituting said head being formed with indentations opening outwardly of said head and extending inwardly of said head.

5. A flower holder comprising a wire bent to form a stem and a radial member at right angles thereto, said wire being continued from said radial member to form a substantially circular head around said stem as a center, said head having indentations of unequal depths.

6. A flower holder comprising a wire bent to form a stem and a radial member at right angles thereto, said wire being continued from said radial member to form a substantially circular head around said stem as a center, said head having indentations opening outwardly of said head and extending inwardly of said head.

7. A flower holder comprising a flat substantially circular head having marginal indentations and a stem extending from the center of said head.

8. A flower holder comprising a flat substantially circular head having marginal indentations of unequal depths and a stem extending from the center of said head.

In testimony whereof I affix my signature.

ROBERT KRUMHOLZ.